United States Patent
Wang et al.

(10) Patent No.: US 10,838,126 B2
(45) Date of Patent: Nov. 17, 2020

(54) ELECTRONIC DEVICES WITH INFRARED BLOCKING FILTERS

(71) Applicant: Apple Inc., Cupterino, CA (US)

(72) Inventors: Ligang Wang, San Jose, CA (US); Zhang Jia, San Jose, CA (US); Serhan O. Isikman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/630,830

(22) Filed: Jun. 22, 2017

(65) Prior Publication Data

US 2018/0081100 A1    Mar. 22, 2018

Related U.S. Application Data

(60) Provisional application No. 62/396,757, filed on Sep. 19, 2016.

(51) Int. Cl.
*G02B 5/20* (2006.01)
*G02B 5/28* (2006.01)

(52) U.S. Cl.
CPC .............. *G02B 5/282* (2013.01); *G02B 5/285* (2013.01)

(58) Field of Classification Search
CPC . G02B 1/00; G02B 1/002; G02B 1/10; G02B 5/00; G02B 5/003; G02B 5/20; G02B 5/205; G02B 5/207; G02B 5/208; G02B 5/22; G02B 5/226; G02B 5/23; G02B 5/26; G02B 5/28; G02B 5/281; G02B 5/282

See application file for complete search history.

(56) References Cited

U.S. PATENT DOCUMENTS

| | | | |
|---|---|---|---|
| 4,594,995 A | * | 6/1986 | Garrison ................. C23C 28/00 126/569 |
| 5,629,515 A | | 5/1997 | Maekawa |
| 5,925,453 A | * | 7/1999 | Kase ................. B32B 17/10009 428/323 |
| 6,078,704 A | | 6/2000 | Bischel et al. |
| 7,006,741 B1 | | 2/2006 | Yu |
| 7,482,574 B2 | | 1/2009 | Wang |
| 8,073,300 B2 | | 12/2011 | Harle et al. |
| 8,096,695 B2 | | 1/2012 | Ong |
| 8,434,909 B2 | | 5/2013 | Nichol et al. |

(Continued)

FOREIGN PATENT DOCUMENTS

| | | |
|---|---|---|
| EP | 2273309 B1 | 5/2016 |
| JP | 2001133623 A | 5/2001 |
| JP | 2008303130 A | 12/2008 |

*Primary Examiner* — Thong Q Nguyen
(74) *Attorney, Agent, or Firm* — Treyz Law Group, P.C.; G. Victor Treyz; David K. Cole (57) ABSTRACT

An electronic device may be provided with one or more light-sensing components such as a camera and a color ambient light sensor. Optical structures such as camera lenses or a light pipe may be used to convey light from a window in an electronic device to a light-sensing component. One or more infrared-light-blocking-and-visible-light transmitting light filters may be interposed between a light-receiving window in an electronic device and a light-sensing component. The light filters may include infrared-light-blocking glass substrates, silver or other infrared-light-blocking thin films, and/or thin-film interference filters formed from stacks of dielectric layers that serve as infrared light-blocking layers.

18 Claims, 9 Drawing Sheets

(56) References Cited

U.S. PATENT DOCUMENTS

| | | |
|---|---|---|
| 8,788,002 B2 | 7/2014 | LeBoeuf et al. |
| 8,797,269 B2 | 8/2014 | Broga et al. |
| 8,905,610 B2 | 12/2014 | Coleman et al. |
| 8,912,480 B2 | 12/2014 | Pope et al. |
| 9,052,771 B2 | 6/2015 | Goertz et al. |
| 9,110,200 B2 | 8/2015 | Nichol et al. |
| 9,366,752 B2 | 6/2016 | Ruh |
| 9,523,807 B2 | 12/2016 | Niochol et al. |
| 9,612,170 B2 | 4/2017 | Vosgueritchian et al. |
| 9,658,706 B2 | 5/2017 | Ahn |
| 9,671,643 B2 | 6/2017 | Woestenborghs et al. |
| 9,778,076 B2 | 10/2017 | Lee et al. |
| 9,843,014 B2 | 12/2017 | Xu et al. |
| 9,846,473 B1 | 12/2017 | Kalscheur et al. |
| 9,891,098 B2 | 2/2018 | Shedletsky |
| 9,958,576 B2 * | 5/2018 | Kawashima ............. G02B 5/22 |
| 10,128,890 B2 | 11/2018 | Thomas et al. |
| 10,131,280 B2 | 11/2018 | De Wind et al. |
| 10,139,294 B2 | 11/2018 | Vosgueritchian et al. |
| 10,175,413 B2 | 1/2019 | Nichol et al. |
| 10,553,179 B2 * | 2/2020 | Holenarsipur ............ G01J 1/44 |
| 2002/0030906 A1 * | 3/2002 | Buczek .................. G02B 5/005 359/885 |
| 2005/0099678 A1 | 5/2005 | Wang |
| 2005/0185267 A1 | 8/2005 | Ockenfuss et al. |
| 2005/0276566 A1 | 12/2005 | Iimura |
| 2006/0008654 A1 * | 1/2006 | Veerasamy ....... B32B 17/10036 428/432 |
| 2008/0102282 A1 * | 5/2008 | Hu ................... B32B 17/10018 428/412 |
| 2008/0226925 A1 * | 9/2008 | Blacker .................. C03C 17/36 428/428 |
| 2008/0262321 A1 | 10/2008 | Erad et al. |
| 2010/0286791 A1 | 11/2010 | Goldsmith |
| 2011/0227487 A1 | 9/2011 | Nichol et al. |
| 2011/0273906 A1 | 11/2011 | Nichol et al. |
| 2011/0277361 A1 | 11/2011 | Nichol et al. |
| 2011/0317018 A1 | 12/2011 | Choe et al. |
| 2012/0019920 A1 * | 1/2012 | Mongan ................ G02B 6/0035 359/601 |
| 2012/0170284 A1 | 7/2012 | Shedletsky |
| 2012/0236303 A1 | 9/2012 | Marple et al. |
| 2012/0299175 A1 | 11/2012 | Tran |
| 2013/0101760 A1 * | 4/2013 | Pesce ................... C03C 17/245 428/34 |
| 2013/0147965 A1 * | 6/2013 | Gao ....................... G02B 5/282 348/164 |
| 2013/0155723 A1 | 6/2013 | Coleman |
| 2013/0181896 A1 | 7/2013 | Gruhlke et al. |
| 2013/0250618 A1 | 9/2013 | Nichol et al. |
| 2014/0049983 A1 | 2/2014 | Nichol et al. |
| 2014/0063597 A1 * | 3/2014 | Shimmo ................ G02B 5/208 359/359 |
| 2014/0110738 A1 * | 4/2014 | Yokobayashi .......... H01L 33/44 257/98 |
| 2014/0163664 A1 | 6/2014 | Goldsmith |
| 2015/0078035 A1 | 3/2015 | Nichol et al. |
| 2015/0192716 A1 * | 7/2015 | Kosaka .................. B32B 15/08 15/8 |
| 2015/0268399 A1 | 9/2015 | Futterer |
| 2015/0277001 A1 * | 10/2015 | Kuriyama ......... H01L 27/14625 250/208.1 |
| 2015/0293284 A1 * | 10/2015 | Tatemura ............... G02B 5/283 359/359 |
| 2016/0011348 A1 * | 1/2016 | Hirakoso ............... G02B 5/206 359/359 |
| 2016/0141156 A1 * | 5/2016 | Watanabe ................ G02B 5/26 204/192.27 |
| 2016/0307542 A1 | 10/2016 | Zheng et al. |
| 2016/0343949 A1 | 11/2016 | Seo et al. |
| 2017/0045669 A1 | 2/2017 | Nichol et al. |
| 2017/0051884 A1 | 2/2017 | Raring et al. |
| 2017/0055906 A1 | 3/2017 | Bremer |
| 2017/0117336 A1 | 4/2017 | Rappoport et al. |
| 2017/0173262 A1 | 6/2017 | Veltz |
| 2017/0229059 A1 | 8/2017 | Bonnier et al. |
| 2018/0031745 A1 * | 2/2018 | Kim ....................... G02B 1/11 |
| 2018/0052274 A1 | 2/2018 | Nichol et al. |
| 2018/0081085 A1 | 3/2018 | Ge et al. |
| 2018/0081100 A1 | 3/2018 | Wang et al. |
| 2018/0359343 A1 | 12/2018 | Lee et al. |
| 2018/0364095 A1 | 12/2018 | Nagaya et al. |
| 2019/0080668 A1 | 3/2019 | Holenarsipur et al. |
| 2019/0094069 A1 | 3/2019 | Xu et al. |
| 2019/0098748 A1 | 3/2019 | Guo et al. |
| 2019/0154439 A1 | 5/2019 | Binder |
| 2019/0170928 A1 | 6/2019 | Nichol et al. |
| 2019/0247050 A1 | 8/2019 | Goldsmith |

* cited by examiner

180
ELECTRONIC DEVICES WITH INFRARED BLOCKING FILTERS

This application claims the benefit of provisional patent application No. 62/396,757, filed Sep. 19, 2016, which is hereby incorporated by reference herein in its entirety.

BACKGROUND

This relates generally to electronic devices and, more particularly, to electronic devices with light-sensing components and infrared-light-blocking filters for light-sensing components.

Electronic devices such as cellular telephones may include cameras, ambient light sensors, and other light-sensing components. It may be desirable to adjust the spectrum of light reaching light-sensing components in an electronic device. For example, light-sensing components that are designed to detect light at visible light wavelengths may be disrupted by near infrared light. It may therefore be desirable to block near infrared light before the near infrared light reaches the light-sensing component. Care must be taken, however, to avoid blocking visible wavelengths of interest and to avoid light-blocking configurations that are overly complex or overly sensitive to operating parameters such as the angle-of-incidence of incoming light rays.

SUMMARY

An electronic device may be provided with one or more light-sensing components such as a camera and a color ambient light sensor. The light-sensing components may receive light through windows in the electronic device. A window may, for example, be formed in an inactive area of a display or may be formed in a portion of an electronic device housing. A light-sensing component may be aligned with a window and may receive light through the window. The light passing through the window may include visible light and infrared light.

Optical structures such as camera lenses or a light pipe may be used to convey light from the window to the light-sensing component. For example, lenses may be used in focusing light for a camera and a light guide formed from an elongated transparent structure may serve as a light pipe that guides light from a window to a color ambient light sensor.

One or more infrared-light-blocking-and-visible-light transmitting light filters may be interposed between a light receiving window in an electronic device and a light-sensing component. The light filters may include infrared-light-blocking glass substrates, thin-film layers of metal such as silver or other infrared-light-blocking thin films, and/or thin-film interference filters formed from stacks of dielectric layers that serve as infrared light-blocking layers.

DETAILED DESCRIPTION

Electronic devices may be provided with light-sensing components. The light-sensing components may include, for example, color ambient light sensors and cameras. To help prevent interference from near infrared light, infrared-light-blocking filters may be used to block infrared light before the infrared light reaches the light-sensing components.

Figure 1:
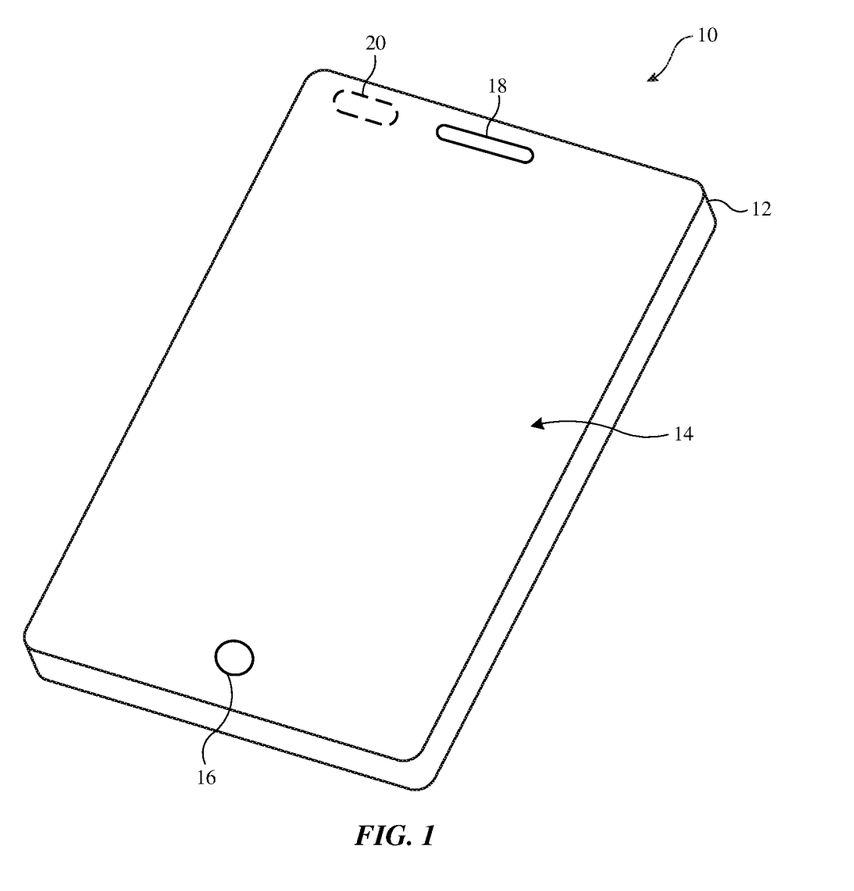
FIG. 1 is a front perspective view of an illustrative electronic device in accordance with an embodiment.

FIG. 1 is a front perspective view of an illustrative electronic device of the type that may include light-sensing components and infrared-light-blocking filters. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma display pixels, an array of organic light-emitting diode pixels, an array of electrowetting pixels, or pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports, holes for buttons, and other structures. If desired, fingerprint sensors and/or other devices may also be mounted under the display cover layer without forming an opening in the display cover layer.

Figure 2:
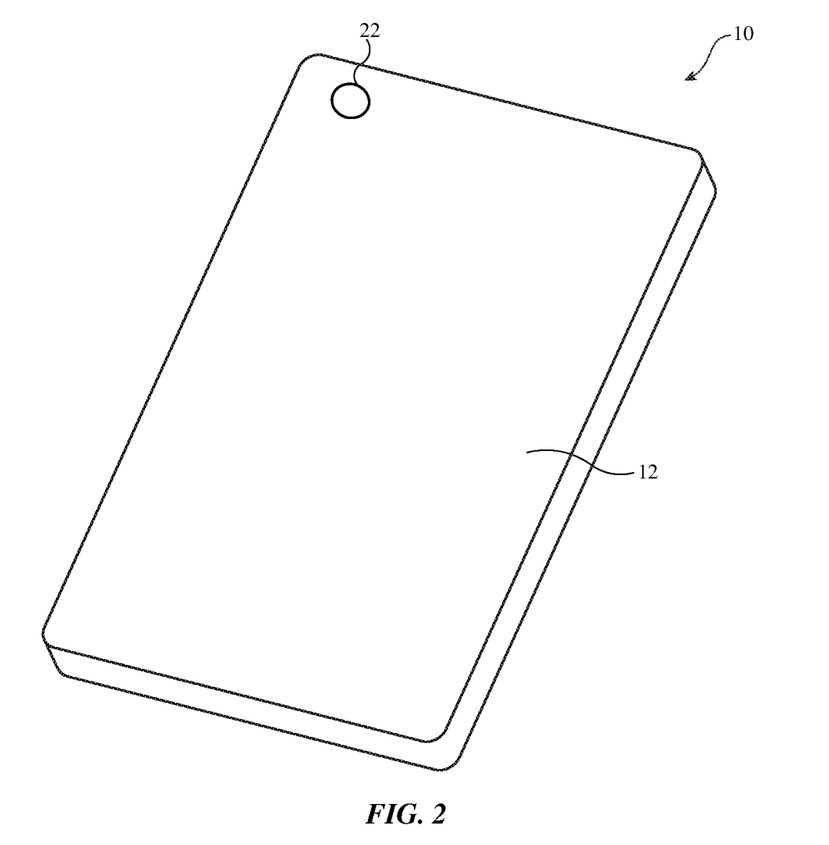
FIG. 2 is a rear perspective view of the illustrative electronic device of FIG. 1 in accordance with an embodiment.

For example, light-sensing components may be formed behind the display cover layer (e.g., in an opening in a black masking layer or other opaque masking layer in an inactive border region of display 14, etc.). As an example, a light-sensing component may be formed in alignment with a front-facing window in a display cover layer associated with display 14 such as window 20 of FIG. 1. Windows such as window 20 may be associated with front-facing cameras and ambient light sensors (e.g., monochromatic ambient light sensors or color ambient light sensors that measure light in multiple color channels). As shown in the illustrative rear perspective view of device 10 in FIG. 2, light-sensing components may also be mounted under windows in the rear of device 10 (e.g., a camera may be mounted under camera window 22 in the rear wall of housing 12 of device 10). Window 22 may be formed from clear glass, transparent plastic, a transparent crystalline material such as sapphire, or other transparent window material.

Figure 3:
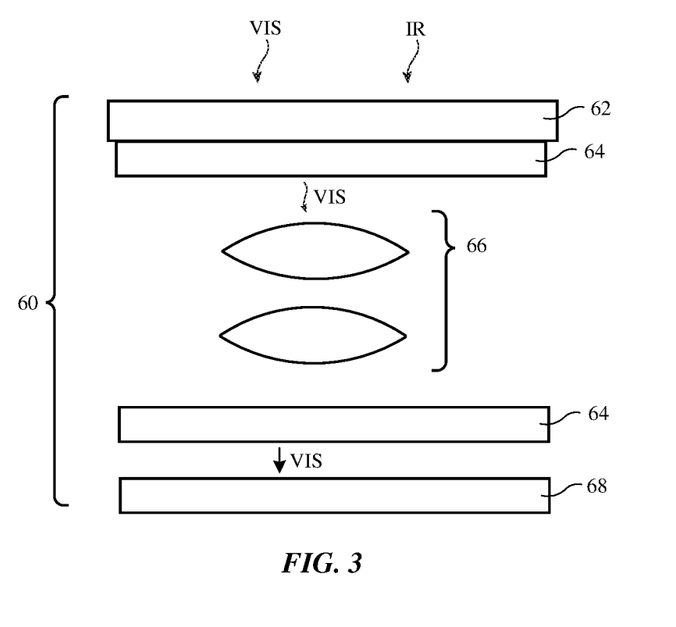
FIG. 3 is a side view of an illustrative camera system of the type that may include one or more infrared-light-blocking filters in accordance with an embodiment.

A cross-sectional side view of an illustrative camera system for device 10 is shown in FIG. 3. As shown in FIG. 3, camera system 60 may include a light-sensing component such as camera 68. Camera 68 may be formed from a visible light digital image sensor. Visible light VIS and infrared light IR from the environment surrounding device 10 may be received by system 60 through transparent layer 62. Transparent layer 62 may, for example, be a camera window such as camera window 22 of FIG. 2 or may be a transparent portion of a display cover layer (see, e.g., window 20 of FIG. 1). Optical system 66 may include one or more lenses for focusing image light onto camera 68. Camera 68 is sensitive to visible light (for forming images), but may exhibit undesired sensitivity at infrared wavelengths. To prevent noise from infrared light, one or more infrared-light blocking filters 64 may be interposed in the optical path between transparent layer 62 and camera 68.

Figure 4:
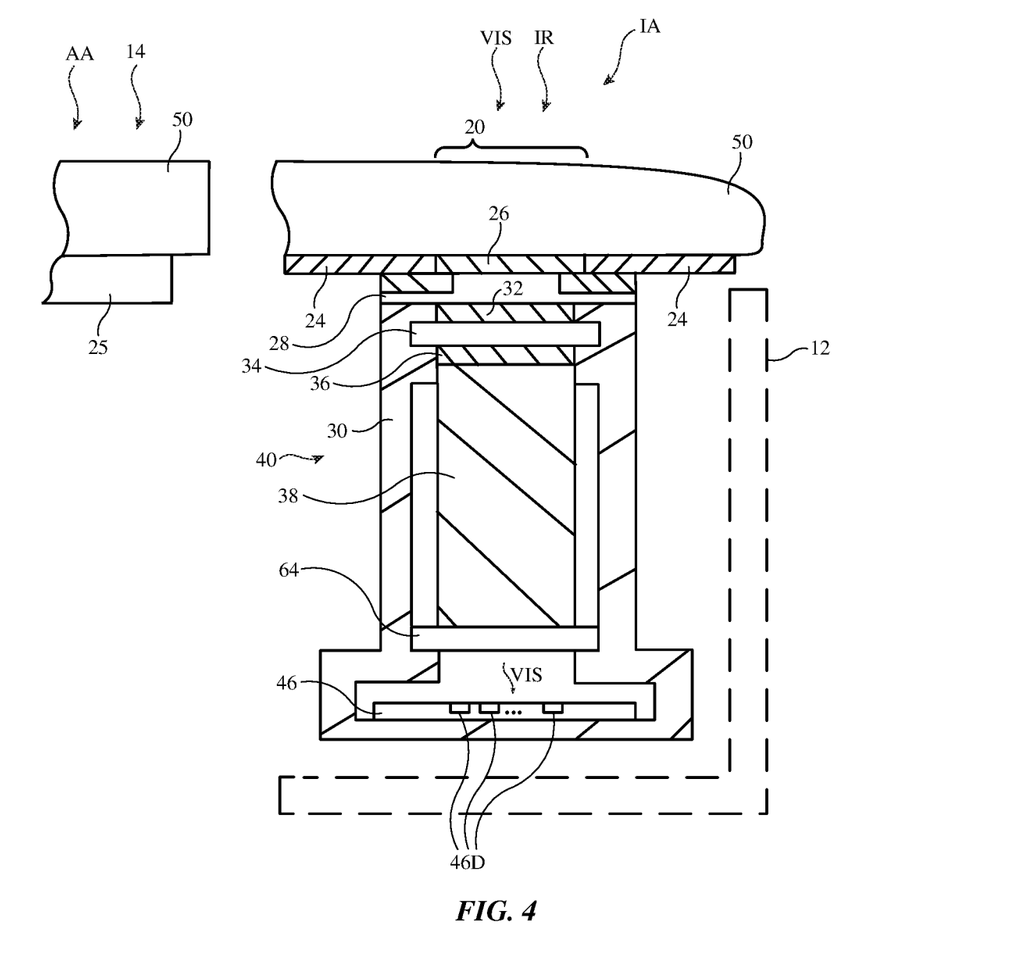
FIG. 4 is a cross-sectional side view of a portion of an illustrative electronic device having a color ambient light sensor with an infrared-light-blocking filter in accordance with an embodiment.

Another illustrative system that may include one or more infrared light blocking filters is an ambient light sensor system such as system 40 of FIG. 4. As shown in FIG. 4, system 40 may include an ambient light sensor such as ambient light sensor 46. Ambient light sensor 46 may include one or more light detectors. For example, ambient light sensor 46 may include multiple light detectors 46D. Light detectors 46D may be sensitive to different portions of the visible light spectrum. For example, light detectors 46D may include a red channel light detector for detecting red light, a blue channel light detector for detecting blue light, etc.

Visible VIS and infrared IR light may be received by system 40 through transparent layer 50. Transparent layer 50 may be a display cover glass layer. In active area AA of display 14, transparent layer 50 may cover an array of pixels such as pixel array 25 (e.g., a display module such as a liquid crystal display or organic light-emitting diode display). Pixel array 25 may display images for a user of device 10 in active area AA. In active area IA of display 14, the underside of transparent layer 50 may be coated with an opaque masking layer such as black masking layer 24 to hide internal components in device 10 from view from the exterior of device 10. Ambient light sensor layer 26 may be formed in an opening in black masking layer 24 that is associated with camera window 20. Ambient light sensor layer 26 may be an ink layer or other layer(s) that is at least somewhat transparent at visible light wavelengths. For example, ambient light sensor layer 26 may have a light transmission of 1-10%, more than 1%, or less than 20% at visible light wavelengths, so that some of visible light VIS is passed to ambient light sensor 46 for measurement by ambient light sensor 46. Infrared light IR may also be at least partly transmitted through layer 26.

Optically clear adhesive 28 may be used to attach support structure 30 to the inner surface of layer 50 in alignment with window 20. Support structure 30 may support optical components such as diffuser layers 32 and 36 (which may be separated by air gap 34) and light guide (light pipe) 38. Light guide 38 may be formed from clear glass, transparent plastic, or other transparent material. Incoming light that has passed to the interior of device 10 through window 20 may be guided to light sensor 46 through light guide 38 in accordance with the principal of total internal reflection. If desired, the exterior of light guide 38 may be coated with metal, dielectric layers, and/or other structures to help reflect and guide light within light guide 38. The presence of light guide 38 in system 40 allows sensor 46 to be placed at a larger distance from layer 50 than would otherwise be possible, thereby facilitating the incorporation of system 40 into a device where space is at a premium. If desired, light guide 38 may be omitted and light sensor 46 may be placed closer to window 20. The example of FIG. 4 is merely illustrative.

To cut infrared light and thereby enhance the performance of light sensor 46 (e.g., to prevent infrared light from creating noise in sensor 46), one or more infrared-light-blocking filters such as infrared-light-blocking filter 64 may be included in system 40. In the example of FIG. 4, infrared-light-blocking filter 64 is interposed between the lower surface of light guide 38 and color ambient light sensor 46. If desired, infrared-light-blocking filter 64 may be incorporated elsewhere within system 40. The example of FIG. 4 is merely illustrative.

Figure 5:
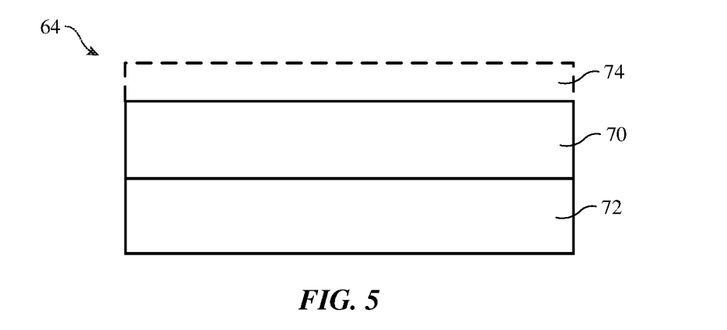
FIG. 5 is a cross-sectional side view of an illustrative infrared-light-blocking filter in accordance with an embodiment.

An illustrative configuration for infrared-light-blocking filter 64 is shown in FIG. 5. As shown in FIG. 5, filter 64 may include a substrate such as substrate 70. One or more additional layers such as layer 72 and 74 may also be incorporated into filter 64. Layers 72 and/or 74 may be separate layers that are attached to substrate 70 by layers of adhesive and/or may be coatings formed from one or more layers on the upper and/or lower surfaces of substrate 70. Substrate layer 70 may be formed from glass, plastic, or other material that is transparent at visible light wavelengths. Substrate layer 70 may be transparent at infrared wavelengths or may be formed from infrared-light-blocking material such as infrared-light-blocking glass. The thickness of layer 70 may be 0.1 mm to 2 mm, 0.5 to 1 mm, more than 0.1 mm, more than 0.2 mm, more than 0.5 mm, less than 3 mm, less than 1 mm, or other suitable thickness.

Layers such as layer 72 and/or 74 may be used to help block infrared light and/or form other functional layers in filter 64 (e.g., an antireflection layer to reduce reflections, etc.). For example, layer 72 may be a thin-film layer formed from a material that blocks infrared light or may be an infrared-light-blocking thin-film interference filter formed from a stack of dielectric layers with different refractive index values. Layer 74 may also be a thin-film layer formed from a material that blocks infrared light or may be an infrared-light-blocking thin-film interference filter formed from a stack of dielectric layers with different refractive index values. If desired, layer 74 and/or layer 72 may be an antireflection layer or may include an antireflection layer and/or layer 74 and/or layer 72 may be omitted. Layers such as layers 74 and 72 (and, if desired, optional additional infrared-light-blocking layers in filter 64) may be formed from thin-films and may have thicknesses of 0.1-2 microns, more than 0.1 microns, more than 0.5 microns, more than 1 micron, more than 2 microns, more than 3 microns, less than 10 microns, less than 5 microns, less than 2 microns, or less than 1 micron (as examples).

Figure 6:
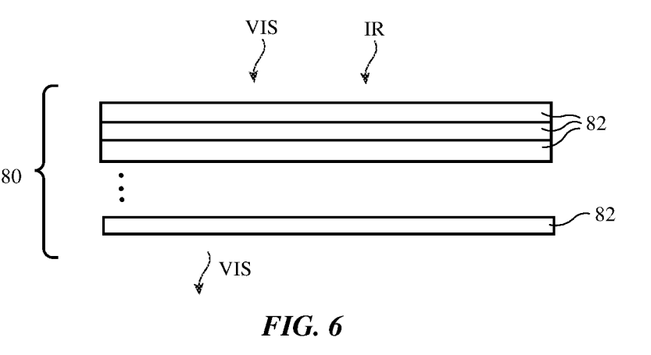
FIG. 6 is a cross-sectional side view of an illustrative infrared-light-blocking filter layer formed from a multilayer thin-film dielectric stack in accordance with an embodiment.

An illustrative visible-light-transmitting and infrared-light-blocking filter layer formed from a multilayer thin-film interference structure is shown in FIG. 6. Filter layer 80 of FIG. 6 may include multiple thin-film dielectric layers 82. Dielectric layers 82 may form an interference filter thin-film stack that transmits visible light VIS while blocking infrared light IR. For example, visible light transmission may be greater than 50%, greater than 90%, less than 99%, or other suitable value and infrared-light-transmission (e.g., at near-infrared wavelengths of 0.7 to 1.2 microns or other suitable near infrared wavelength range) may be less than 20%, less than 10%, less than 1%, less than 0.2%, more than 0.1%, or other suitable value). Layer 80 may be used in forming one or more layers in filter 64 such as layer 72 and/or layer 74 of FIG. 5.

Figure 7:
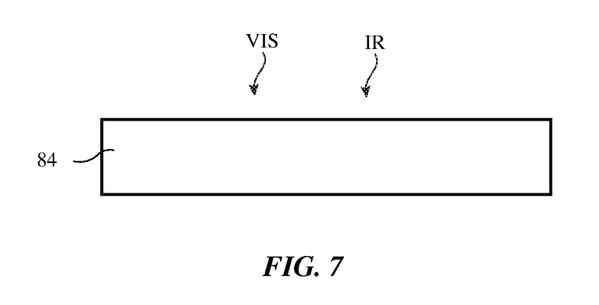
FIG. 7 is a cross-sectional side view of an illustrative infrared-light-blocking filter layer formed from a solid layer of material that absorbs infrared light in accordance with an embodiment.

In the example of FIG. 7, filter layer 84 has been formed from a single layer of material. For example, filter layer 84 may be a thin-film layer of material that blocks infrared light while transmitting visible light (e.g., silver or other metals, etc.). The thickness of layer 84 may be, for example, 1 micron, more than 0.2 microns, more than 0.5 microns, less than 3 microns, less than 2 microns, 0.4 to 2.5 microns, or other suitable thickness. Layer 84 may be used in forming one or more layers in filter 64 such as layer 72 and/or layer 74 of FIG. 5.

Figure 8:
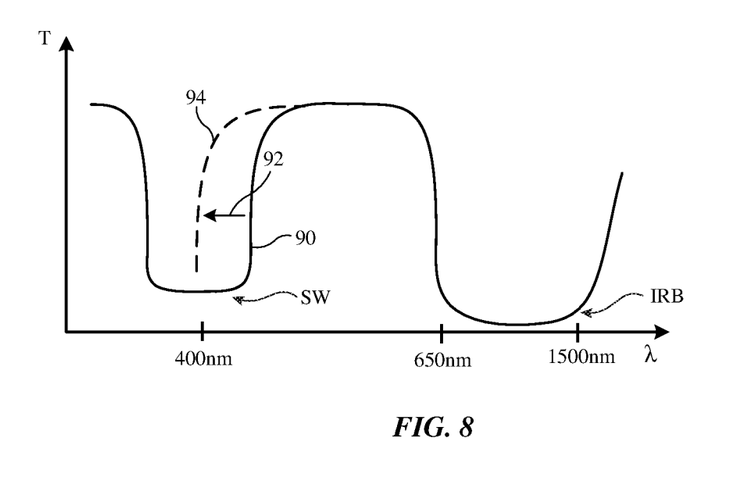
FIG. 8 is a graph in which light transmission has been plotted as a function of wavelength for a thin-film filter formed from alternating higher and lower refractive index thin-film dielectric layers in accordance with an embodiment.

Dielectric layers 82 of filter layer 80 of FIG. 6 may be formed from organic and/or inorganic dielectric materials. As an example, layers 82 may be formed from inorganic materials such as silicon oxide, silicon nitride, silicon oxynitride, titanium oxide, aluminum oxide, other metal oxides, and/or other inorganic materials. The thicknesses of layers 82 and the patterns of layers 82 used in forming filter 80 may be selected to provide layer 80 with a desired transmission spectrum. With one illustrative arrangement, layer 80 may be formed by alternating layers 82 of higher refractive index with layers 82 of lower refractive index. The thicknesses of layers 82 may be selected to produce a stop band IRB that extends from 650 nm to 1500 nm or other suitable near infrared wavelength range, as shown in the transmission spectrum (T) plotted in the graph of FIG. 8. Infrared light blocking may be of particular interest from 700 nm to 1200 nm (or other near infrared wavelengths where sensor 46 is sensitive to infrared-light-induced noise). Downward shifts in the upper end of the stop band wavelength may result when incoming ambient light to sensor 46 has a wide range of angles of incidence. To account for this potential downward shift (and thereby ensure effective stop band coverage at 1200 nm, the nominal (0° angle of incidence) upper edge of the infrared light stop band may be placed at 1500 nm, as shown in FIG. 8. With a two-index (alternating high-low) stack of layers 82 in layer 80, there can be a harmonic in the filter response at wavelengths that are about ⅓ of stop band wavelength IRB, as illustrated by short-wavelength stop band SW. At a 0° angle of incidence, light at short visible light wavelengths (e.g., 400 nm) may be undesirably blocked by the harmonic, but at larger angles-of-incidence edge 90 of band SW shifts in direction 92 to shorter wavelength edge position 94, thereby allowing at least some of the visible light at 400 nm to pass as desired.

Figure 9:
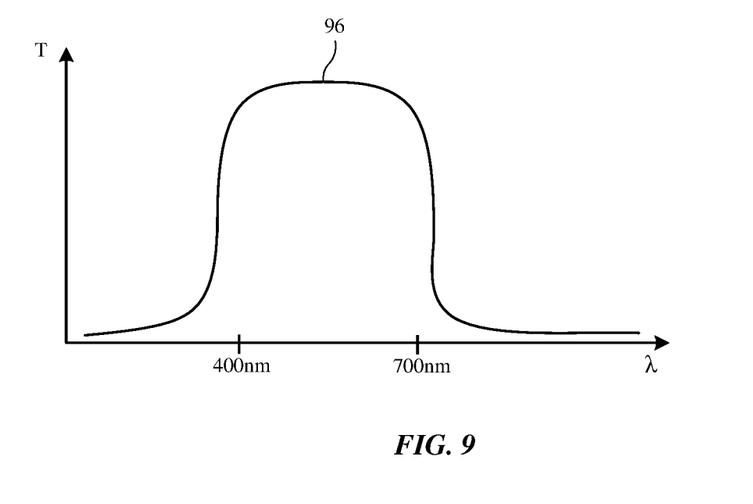
FIG. 9 is a graph in which light transmission has been plotted as a function of wavelength for a thin-film filter formed from a stack of repeating high, medium, and low refractive index layers in accordance with an embodiment.

Another arrangement for allowing visible light VIS to pass while blocking infrared light involves using a three-index design for infrared light blocking filter layer 80. With this type of arrangement, layers 82 include a higher index of refraction layer, a lower index of refraction layer, and a middle index of refraction layer having a refractive index between the higher and lower refractive index values. As an example, layers 82 may include a high refractive index layer formed from titanium oxide (index 2.4), a medium refractive index layer formed from silicon nitride (index 2.0), and a low refractive index layer formed from silicon oxide (index 1.5). A suitable refractive index for the medium refractive index may be determined using the Herpin equivalent index method. The number of layers and the layer thicknesses of the three different refractive index layers 82 in layer 80 may be selected to enhance visible light transmission while blocking more than 90%, more than 99%, more than 99.5% or other suitable amount on infrared light (e.g., near infrared light from 700 nm to 1200 nm, etc.). With one illustrative configuration, there may be more than 10 of layers 82, more than 50 of layers 82, 50-120 of layers 82, or fewer than 130, fewer than 50, or fewer than 20 of layers 82 in layer 80. Curve 96 of FIG. 9 is illustrative of the type of transmission spectrum that may be produced using a three-index (high-medium-low index) stack of layers 82 in forming filter layer 80 (simulated over an illustrative range of angle-of-incidence values for the incoming visible and infrared light).

Figure 10:
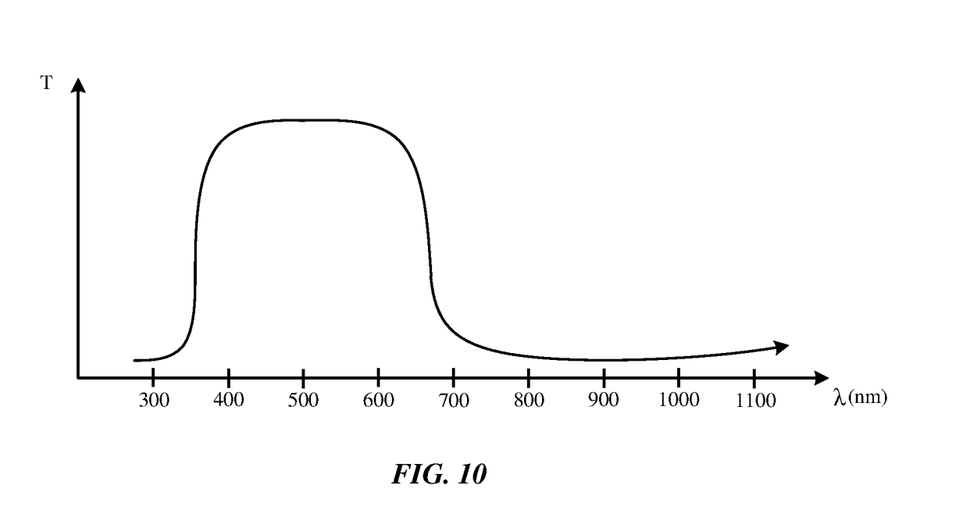
FIG. 10 is a graph in which light transmission has been plotted as a function of wavelength for an illustrative infrared-light-blocking filter layer formed from an infrared-light-blocking glass substrate layer in accordance with an embodiment.

Infrared-light-blocking glass may be used in forming substrate 70. An example of an infrared-light-blocking-and-visible-light-passing glass that may be used for substrate 70 is an ionically colored glass such as Schott BG39 band pass filter glass (e.g., glass that is doped with infrared-light-absorbing dopant ions). An illustrative transmission spectrum for an infrared-light-blocking glass layer for substrate 70 is shown in FIG. 10.

Figure 11:
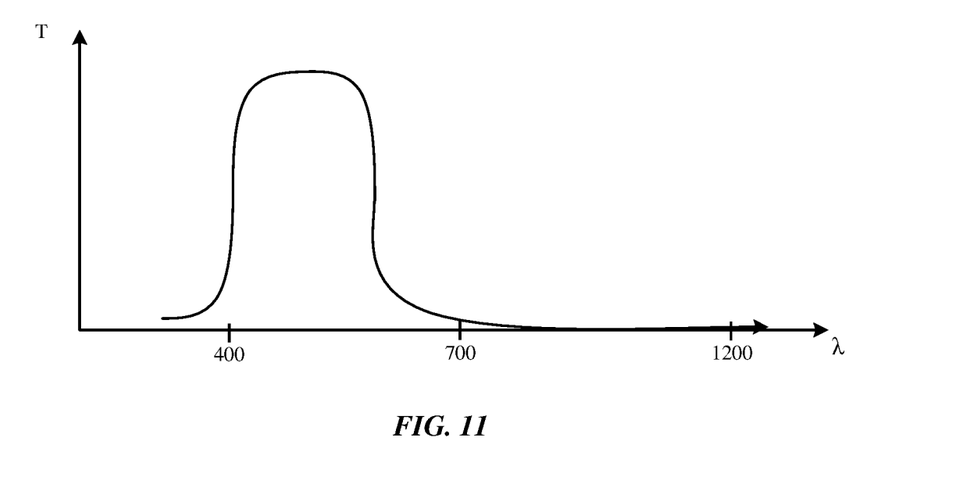
FIG. 11 is a graph in which light transmission has been plotted as a function of wavelength for an illustrative infrared-light-blocking filter layer formed from an infrared-light-blocking thin-film layer such as a metal thin-film layer in accordance with an embodiment.

A solid infrared-light-blocking-and-visible-light-transmitting layer such as a layer of silver or other metal may be used in forming layer 72 and/or layer 74. The light transmission spectrum for an illustrative filter layer formed from a 1 micron thick coating of silver is shown in the graph of FIG. 11. If desired, a silver filter layer or other infrared-light-blocking thin-film layer may have other thickness (e.g., more than 0.1 microns, more than 0.5 microns, less than 4 microns, less than 1.5 microns, etc.).

Figure 12:
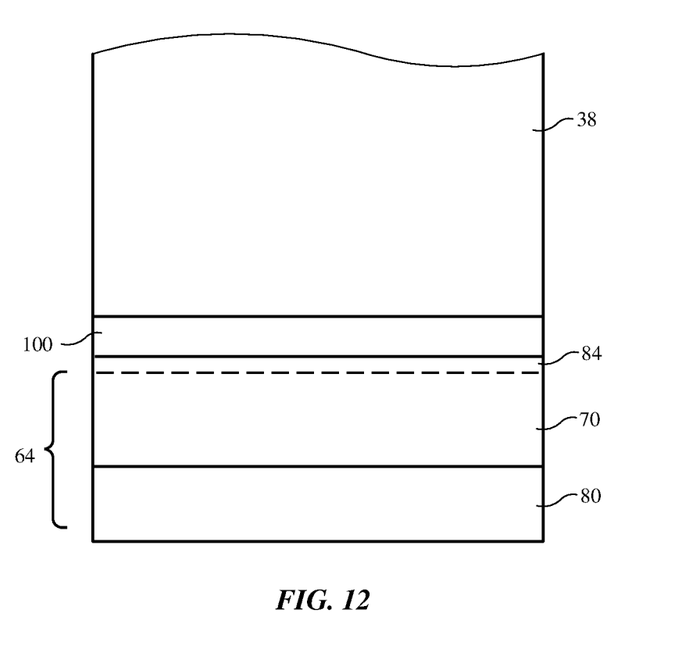
FIG. 12 is a side view of an illustrative infrared-light-blocking filter attached to a light pipe structure with a layer of adhesive in accordance with an embodiment.

FIG. 12 shows how filter 64 may be mounted on the lower surface of light guide 38 using a layer of adhesive 100 (e.g., epoxy, etc.). Filter 64 may include infrared-light-blocking glass substrate layer 70. Additional infrared light blocking may be provided by thin-film interference layer 80 and/or silver layer 84. By interposing silver layer 84 between layer 70 and light guide 38, tarnishing of silver layer 84 may be avoided. In configurations in which infrared-light-blocking is provided by interference filter 80, layer 84 may, if desired, be omitted to reduce filter complexity. If desired, light guide 38 may be formed from infrared-light-blocking-and-visible-light-transmitting glass (e.g., ionically colored glass). Metal structures (e.g., a silver layer that helps absorb infrared light) or other reflective structures may be formed on the outer surfaces of light guide 38 to help enhance light guiding. Filter 64 of FIG. 12 may be used as part of a color ambient light sensor system, as described in connection with FIG. 4. If desired, filters 64 may be used in other contexts such as in forming infrared-light-blocking filters 64 for camera 68 of camera system 60 of FIG. 3. The configuration of FIG. 12 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a window that transmits visible light and infrared light;
a layer of material on the window that has a light transmission of 1-10%;
a light sensitive component aligned with the window; and
an infrared-light-blocking filter configured to receive the visible and infrared light and to pass the visible light and block the infrared light, comprising:
an infrared-light-blocking-and-visible-light-transmitting glass substrate that is configured to pass the visible light and block the infrared light, wherein the infrared-light-blocking-and-visible-light-transmitting glass substrate has opposing first and second surfaces;
a thin-film interference filter formed from a stack of dielectric layers with different refractive indices on the first surface of the infrared-light-blocking-and-visible-light-transmitting glass substrate, wherein the thin-film interference filter is configured to pass the visible light and block the infrared light; and
a layer of metal on the second surface of the infrared-light-blocking-and-visible-light-transmitting glass substrate that blocks the infrared light and passes the visible light.

2. The electronic device defined in claim 1 wherein the thin-film interference filter includes a stack of dielectric layers having first, second, and third refractive index values, wherein the second refractive index value is between the first and third refractive index values.

3. The electronic device defined in claim 2 wherein the infrared-light-blocking-and-visible-light-transmitting glass substrate is an ionically colored glass layer.

4. The electronic device defined in claim 3 wherein the layer of metal comprises a layer of silver.

5. An electronic device comprising:
a window that transmits visible light and infrared light;
a layer of material on the window that has a light transmission of 1-10%;
a light sensitive component aligned with the window; and
an infrared-light-blocking filter between the window and the light sensitive component comprising:
an infrared-light-blocking-and-visible-light-transmitting glass substrate; and
a thin-film layer of metal on the infrared-light-blocking-and-visible-light-transmitting glass substrate that blocks infrared light and passes visible light.

6. The electronic device defined in claim 5 wherein the infrared-light-blocking-and-visible-light-transmitting glass substrate is an ionically colored glass layer.

7. The electronic device defined in claim 6 wherein the layer of metal comprises a layer of silver.

8. The electronic device defined in claim 6 wherein the layer of silver has a thickness of 0.4 microns to 2.5 microns.

9. An electronic device, comprising:
a window that transmits visible and infrared light;
a layer of material on the window that has a light transmission of 1-10%;
a light sensitive component aligned with the window; and
a light filter between the window and the light sensitive component that blocks the infrared light and transmits the visible light, wherein the light filter includes an infrared-light-blocking-and-visible-light-transmitting glass substrate and a thin-film interference filter formed from a stack of dielectric layers with different refractive indices on the infrared-light-blocking-and-visible-light-transmitting glass substrate.

10. The electronic device defined in claim 9 wherein the light sensitive component comprises a light sensitive component selected from the group consisting of: a camera and an ambient light sensor.

11. The electronic device defined in claim 10 wherein the thin-film interference filter includes a stack of dielectric layers having first, second, and third refractive index values and wherein the second refractive index value is between the first and third refractive index values.

12. The electronic device defined in claim 10 wherein the thin-film interference filter includes a stack of dielectric layers having alternating higher and lower indices of refraction.

13. The electronic device defined in claim 9 wherein the light-sensing component comprises a color ambient light sensor.

14. The electronic device defined in claim 13 further comprising a light guide that guides the visible and infrared light from the window to the light filter.

15. The electronic device defined in claim 14 further comprising a layer of adhesive that attaches the light filter to a surface of the light guide.

16. The electronic device defined in claim 15 further comprising a layer of metal interposed between the layer of adhesive and the infrared-light-blocking-and-visible-light-transmitting glass substrate.

17. The electronic device defined in claim 13 further comprising:
an array of pixels; and a display cover layer having a first portion that overlaps the array of pixels and having a second portion coated with an opaque masking layer, wherein the window is formed in an opening in the opaque masking layer.

18. The electronic device defined in claim 17 wherein the light filter further comprises a layer of metal that blocks the infrared light and that passes the visible light.

* * * * *